Figure 1:
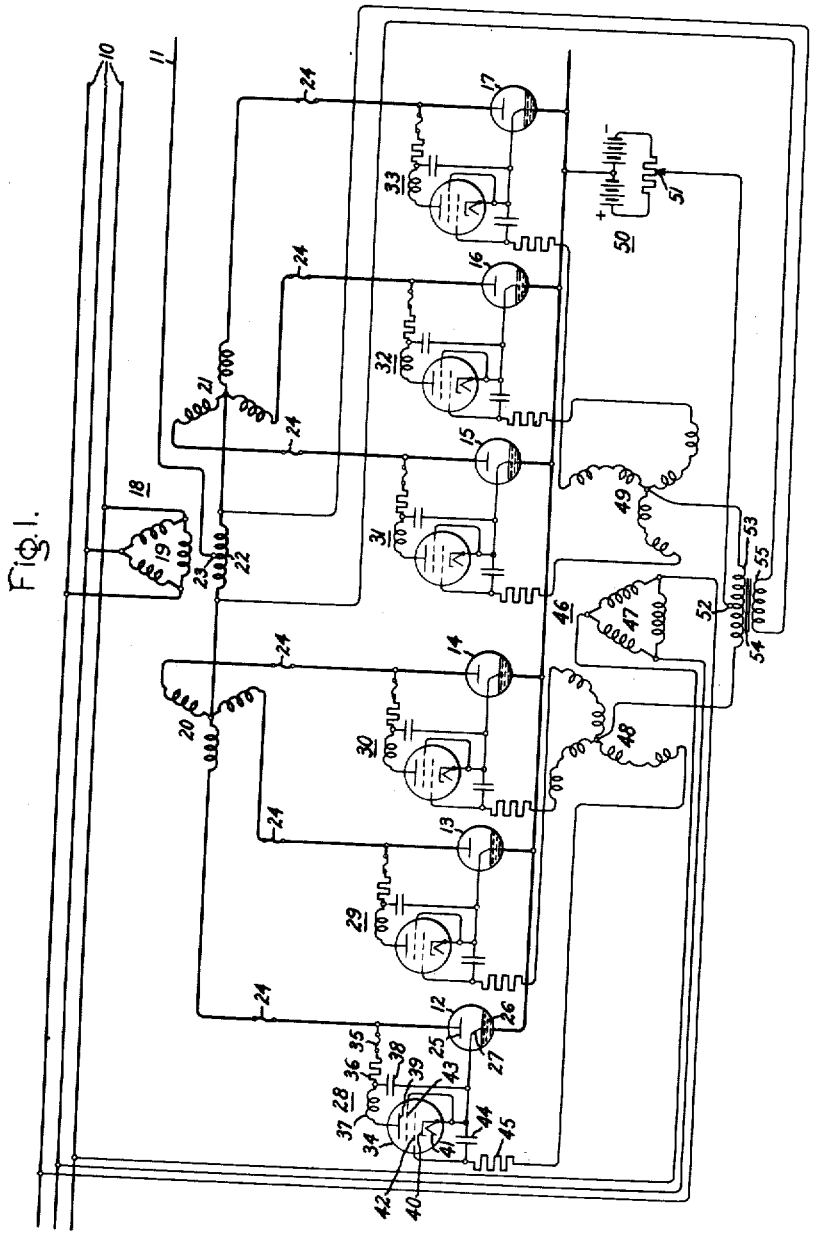

March 10, 1942.  C. H. WILLIS ET AL  2,275,877
ELECTRIC VALVE CONVERTING APPARATUS
Filed May 2, 1940  2 Sheets-Sheet 1

Inventor:
Clodius H. Willis,
Martin A. Edwards,
by Harry E. Dunham
Their Attorney.

Patented Mar. 10, 1942

2,275,877

UNITED STATES PATENT OFFICE 2,275,877

ELECTRIC VALVE CONVERTING APPARATUS

Clodius H. Willis, Princeton, N. J., and Martin A. Edwards, Scotia, N. Y., assignors to General Electric Company, a corporation of New York Application May 2, 1940, Serial No. 332,974

11 Claims. (Cl. 175—363)

Our invention relates to electric valve converting systems for transmitting power between direct and alternating current circuits, between two alternating current circuits of the same or different frequencies, or between two direct current circuits of different voltages, and more particularly to improved systems of this character in which balanced conditions between the currents transmitted by two or more valves or groups of valves of the system are maintained.

In electric valve converting systems in which two or more valves, or groups of valves, are operating in parallel there is a tendency for certain of the valves to take more than their proportionate share of the load. This unbalancing or uneven distribution of the current among the various branches of the system may be due to a variety of causes including variations in the voltage drop in the arc discharge of the various valves, or to variations in the starting characteristics of the valves. Where the main valves are of the type which utilize an immersion ignitor type of control electrode the characteristics of the auxiliary valves may not all be identical and this contributes to the tendency of the current transmitted by the various main valves to be unequal. Variations in the electrical characteristics of the phase windings of the power transformer with which the electric valves are associated also contribute to the tendency of the system to operate with unequal division of load among the various valves. In systems employing a plurality of groups of phase windings interconnected by an interphase transformer and having the electric valves associated with one group of phase windings arranged to conduct alternately and in overlapping relation with the valves associated with the other group of phase windings the tendency for the load to divide unevenly may result in one group of phase windings taking all the load and operating as a system having a number of phases equal to that of one of the groups. These difficulties are encountered particularly when the system is operating at light load. Unequal load division tends to give the system poor voltage regulation with load and increases the number of arc-backs particularly if the excitation circuits are controlled in an attempt to maintain the voltage constant.

Arrangements have been provided for the purpose of overcoming the tendency of the currents in the different portions of electric valve converting systems to become unbalanced but these systems have had various disadvantages. In some arrangements inductive devices were inserted in circuit with the transformer secondary which tended to carry too much current in order to correct the unbalance. Such arrangements offered only a single correction which did not vary automatically to take care of varying conditions existing during the operation of the equipment. Other arrangements have proved to be slow in correcting the unbalance or complicated and undesirable from the cost standpoint.

It is accordingly an object of our invention to provide an improved electric valve converting system which provides for balancing the current between different discharge paths of the system in a simple and reliable manner.

It is another object of our invention to provide an improved current balancing arrangement for electric valve converting apparatus which continually maintains the current balance during operating conditions.

It is another object of our invention to provide an improved electric valve converting system in which an electrical characteristic of the power circuit which varies automatically with unbalance of the current in the discharge paths of the converting system is utilized to modify the excitation of the various valves of the system in such a manner as to restore a current balance in the system.

In accordance with an illustrated embodiment of our invention we provide an electric valve converting system including a transformer having a pair of Y-connected secondary windings interconnected by an interphase transformer and a plurality of electric discharge valves associated with the phase windings of the Y-connected secondaries. In order to balance the currents between the two Y-connected secondary windings means are provided for applying the potential appearing across the interphase transformer to the excitation circuit of the valves associated with both of the groups of Y-connected phase windings. The excitation circuit for the valves associated with the two secondary windings includes a pair of Y-connected secondary windings of an excitation transformer for supplying an alternating control potential. The interphase voltage is introduced into the excitation circuit through a transformer, the secondary of which is connected between the neutrals of the secondary windings of the excitation transformer. When the currents flowing through the two Y-connected secondaries are equal the interphase voltage is symmetrical so that the introduction of this voltage into the excitation circuit does not change the division of load between the valves associated with the different secondary windings of the main transformer. When the division of load is unequal the interphase voltage is no longer symmetrical and when properly introduced into the excitation circuit advances the ignition of those valves which are carrying less than their share of the load current and retards the ignition of those valves associated with the secondary windings which are carrying less than their share of the load current. In accordance with another illustrated embodiment the interphase voltage is introduced into an excitation circuit employing peaking transformers in such a way that a current balance is maintained between the different groups of tubes of the valve converting system.

The novel features which we believe to characterize our invention are set forth with particularity in the appended claims. Our invention itself, however, both as to its organization and operation will best be understood by reference to the following description taken in connection with the accompanying drawings in which Fig. 1 diagrammatically represent an electric valve converting system embodying our invention, and Fig. 2 is a diagrammatic representation of a system embodying a modification.

Figure 2:
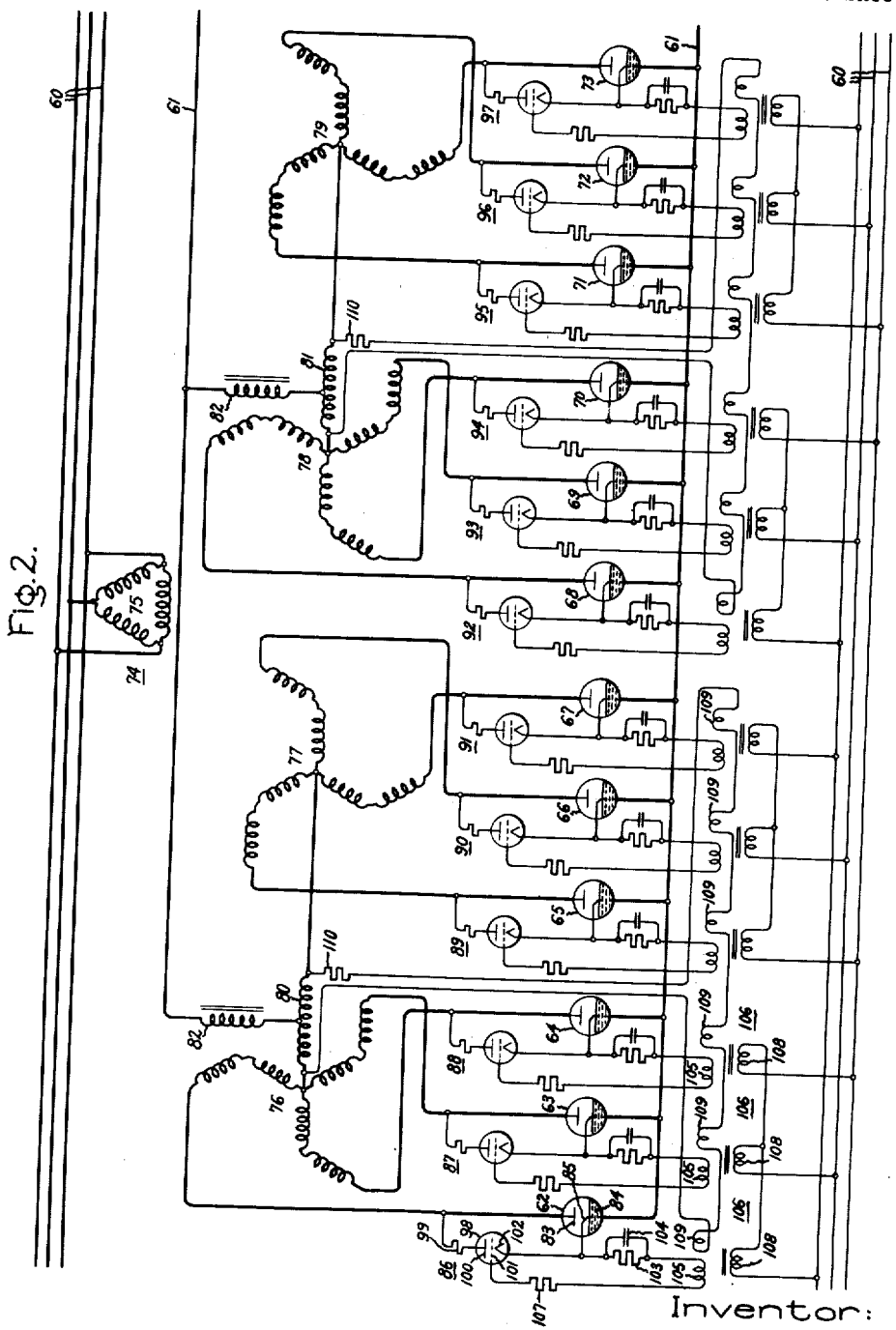

Referring now to Fig. 1 of the drawings, we have illustrated therein a system embodying our invention for transmitting energy from a polyphase alternating current supply circuit 10, having three phases, to a direct current load circuit 11. An electric valve translating apparatus including main electric discharge valves 12 to 17, inclusive, and a transformer 18 are arranged to transmit energy between the supply and load circuits 10 and 11, respectively. The transformer 18 may comp.-ise a primary winding 19 and groups of Y-connected secondary windings 20 and 21, the neutrals of which are interconnected by means of an interphase transformer 22 to produce a double three-phase system of the double Y type. The midpoint 23 of interphase transformer or phase equalizing inductive impedance element 22 is connected to one side of the direct current circuit 11, while the other side of the direct current circuit is connected to the cathodes of the main electric discharge valves 12 to 17. As indicated, suitable fuses 24 may be connected in series relation with the electric valves 12 to 17, inclusive. The electric valves 12 to 17 are preferably of the type employing an ionizable medium such as a gas or a vapor, and each comprises an anode 25, a cathode of the self-reconstructing type such as a mercury pool cathode 26, and a control member 27 of the make-alive or the immersion ignitor control member type. The immersion ignitor control members 27 are of a material having a substantially greater electrical resistivity than that of the associated mercury pool cathode 26. In order to establish an arc discharge between the anode 25 and the cathode 26, it is necessary that a predetermined minimum critical flow of current be transmitted through the immersion ignitor control member 27. The main or power arc discharge path of each of the electric valves 12 to 17, of course, lies between the anode 25 and the cathode 26.

Excitation circuits 28 to 33 are associated with electric valves 12 to 17, respectively, and may be connected to be responsive to the anode-cathode voltage of the associated main power electric valve. Each of the excitation circuits 28 to 33 includes a control electric valve 34 which may be connected between the anode 25 and the immersion ignitor control member 27 of the associated electric valve through a current limiting means such as a fuse 35, a resistance 36 and an inductive reactance 37. The fuse 35 protects the control electric valves 34 while the resistor 36 limits the surge peak current which might flow through the auxiliary control electric valve in the event the main electric discharge valve does not conduct. The inductive reactance 37 combined with a capacitor 38 which is connected in parallel with the control electric valves 34 decrease the high frequency oscillations which are undesirable from the standpoint of radio interference. The control electric valves 34 are preferably of the type employing an ionizable medium and each comprises an anode 39, a cathode 40, a filament or cathode heating element 41 therefor, and a control member or grid 42. As illustrated the electric valves 34 may be of the type employing a screen or shield grid 43 which is connected to a point less positive than the anode and may be connected directly to the cathode. A capacitance 44 is connected between the cathode 40 and the control grid 42 to absorb transient voltage variations which may be present in the grid circuit due to the anode circuit. A current limiting resistance 45 may be connected in series relation with the control grid 42 and a grid or excitation circuit which will now be described.

In order to impress on the control grids 42 of electric control valves 34 in excitation circuits 28—33 alternating voltages preferably having a lagging phase displacement relative to the anode-cathode voltages of the respective control electric valves, we employ a transformer 46 having a primary winding 47 and groups of secondary windings 48 and 49. The primary winding 47 of transformer 46 may be energized with alternating potential from any suitable supply which has a fixed phase relationship with said anode supply, and is illustrated as being energized from alternating current supply circuit 10. The secondary windings 48 and 49 of grid transformer 46 are connected in zigzag wye relationship so that the alternating grid potentials have a lagging phase displacement relative to the potentials of the secondary windings 20 and 21 of the main power transformer 18. It will be understood by those skilled in the art that in the arrangement described above a positive direct current bias impressed on the neutrals of the secondary windings 48 and 49 of grid transformer 46 will advance the phase of the grid excitation of control valves 34 and cause them to be conductive at an earlier point in the anode voltage wave. Conversely, a negative bias will retard the phase of the excitation and render control electric valves 34 conductive at a later time in the cycle of the anode voltage wave. In order to obtain this direct current bias to advance or retard the grid excitation of control electric valves 34 we provide a potentiometer regulator 50 the moving arm 51 of which is connected to the neutral terminals of grid transformer secondary windings 48 and 49 through the midpoint connection 52 of the secondary windings 53 of a transformer 54. The fixed terminal of the potentiometer regulator 50 is connected to the cathodes of the control electric valves 34 through cathodes 26 and immersion ignitor type of control electrodes 27 of the main electric discharge valves 12 to 17. If desired a suitable phase shifter may be connected in the circuit connecting supply lines 10 and the primary 47 of excitation transformer 46, in which case the potentiometer 50 may be omitted and the midpoint 52 of transformer 54 connected directly with one side of the direct current circuit 11.

As will be understood by those skilled in the art the particular embodiment of my invention described above operates to transmit power from the alternating current supply circuit 10 to the direct current load circuit 11 as a double three-phase rectifier with the electric valves associated with the secondary winding 20 of the power transformer conducting current alternately and in overlapping relation with the period of conduction of the valves associated with the secondary winding 21. The voltage of the direct current circuit may be regulated by the potentiometer adjustment of the excitation circuit, as is well understood by those skilled in the art.

In the operation of systems of this character there has been a persistent tendency of the valves associated with one of the secondary windings of the main transformer to take more than its proportionate share of the load and in accordance with our invention we provide a simplified and improved means for automatically and continuously maintaining a current balance between the valves associated with the different secondary windings. In the illustrated embodiment of Fig. 1 the balance is maintained by inserting in the grid circuit between the neutrals of the secondary windings 48 and 49 of the excitation transformer the voltage across the interphase transformer 22 by means of the transformer 54, the primary winding 55 of which is connected directly across the interphase transformer.

In the operation of the system described above it will be apparent to those skilled in the art that as long as the currents transmitted by the valves associated with the secondary winding 20 are equal to those transmitted by the valves associated with secondary winding 21, the interphase voltage will be a harmonic voltage with symmetrical positive and negative half cycles, which, when introduced into the grid circuit, as shown, will have the same effect on the instant of ignition of the valves associated with each of the phase windings. It has been found, however, that by introducing the interphase voltage into the grid circuit so that it tends to retard the instant that the valves of both groups are rendered conductive when the load is balanced the interphase voltage varies with unbalance of load in such a way as to restore the balance. The exact manner in which the interphase voltage changes during unbalanced conditions to accomplish the regulating effect is not clearly understood, but it is believed that the alternate half cycles of the interphase voltage which occur at a time to control the ignition of the valves associated with the different groups of phase windings are temporarily unequal in magnitude or are shifted in phase relation with respect to the anode voltage in such a direction as to advance the moment of ignition of those valves which are carrying less than their share of the load. Regardless of whether or not the change in the interphase voltage is a matter of phase shift or a matter of temporary inequality in magnitude between the positive and negative half cycles of the interphase voltage, or a combination of the two, it has been found that this arrangement is very effective for maintaining the desired load division between the two groups of phase windings and the valves associated therewith.

In Fig. 2 we have illustrated a modified circuit arrangement embodying our invention in which two double three-phase rectifier circuits are employed for transmitting current between the three-phase alternating current circuit 60 and the direct current circuit 61. The alternating current circuit 60 and direct current circuit 61 are interconnected by an electric valve translating apparatus including main electric discharge valves 62 to 73 and a power transformer 74 having a delta connected primary winding 75 connected to the alternating current source 60. The transformer 74 is provided with four groups of three-phase Y-connected secondary windings 76, 77, 78 and 79. The secondary windings 76 and 77 have their neutral points interconnected by an interphase transformer 80 and, together with the main discharge valves 62 to 67, comprise a double three-phase rectifier for transmitting power from the alternating current circuit 60 to the direct current circuit 61. Similarly, secondary windings 78 and 79 have their neutral points connected by an interphase transformer 81 and the extremities of their phase windings connected to one line of the direct current circuit through main discharge valves 68 to 73 to form a second double three-phase rectifier operating in parallel with the double three-phase rectifier including secondary windings 76 and 77. The cathodes of valves 62 to 73 are connected together and to one line 61 of the direct current circuit. The other line 61 of the direct current circuit is connected to the midpoint of the interphase transformers 80 and 81. A reactor 82 is included in series with the midpoint connection of each of the interphase transformers 80 and 81 and the direct current line. As indicated in the drawings, the phase windings of secondary winding 76 are displaced with respect to the phase windings of secondary winding 77 by an amount equal to half of the electrical displacement between the successive phase windings of the secondary windings 76 and 77. The successive phase windings of the secondary windings 78 and 79 are similarly displaced.

The main electric valves 62 to 73 may be of any known construction, and as illustrated comprise an envelope filled with an ionizable medium and having an anode 83, a self-reconstructing type cathode such as a mercury pool 84, and an immersion igniter type control member 85. In order to control the conductivities of the main valves each is provided with an excitation circuit illustrated generally by numerals 86 to 97. Each of the excitation circuits includes a control electric valve 98 which may be connected between the anodes and the immersion igniter control member of the associated main electric valve through a current limiting resistor 99. The control electric valves are preferably of the type employing an ionizable medium and each comprises an anode 100, a cathode 101, and a control member or grid 102. The conductivities of the auxiliary valves are controlled by a grid-to-cathode circuit including in series a self-biasing arrangement including a resistor 103 and a capacitor 104 in parallel, the secondary winding 105 of an excitation transformer 106 and a current limiting resistor 107. It should be noted that these excitation circuits for the auxiliary or firing valves 98 associated with the main valves 62 to 73 eliminate the immersion igniter and cathode of each main valve from the grid circuit of its associated control valve. The excitation circuits for the different control valves are isolated from each other and voltages from one valve do not affect the operation of another valve. This arrangement has been found to overcome the tendency of certain of the control valves to prefire at light loads. Primary windings 108 of the excitation transformers associated with the main valves 62, 63 and 64 are connected in Y-relationship and are energized from a three-phase source of alternating current which has a fixed phase relation with the source 60 and may, as illustrated, be connected to the alternating current supply 60 through a suitable phase shifting device (not shown). The transformers 106 are preferably of the type having the secondary winding 105 wound on a portion of the core structure which is saturable to provide a secondary voltage of peaked wave form. The primary windings of the excitation transformers are connected to the various phases of the supply in such a manner that the valves are rendered conductive in the proper sequence to give the desired double three-phase operation.

The operation of the system thus far described is very similar to that described in connection with Fig. 1 and is believed to be apparent to those skilled in the art. When operating as a rectifier for transmitting energy from the current 60 to the direct current circuit 61 the secondary windings 76 and 77 and the main valves 62 to 67 operate as a double three-phase rectifier and windings 78 and 79 and the electric discharge valves associated therewith operate as a double three-phase rectifier in parallel therewith. The inductive windings 82 connected between the interphase transformers 80 and 81 of the two double three-phase rectifiers serve to aid in the division of load between these rectifiers. Although load balancing means in accordance with the present invention may be employed to balance the load between these two double three-phase rectifiers, if desired, this will often be unnecessary. In the operation of the arrangement shown in Fig. 2 both of the double three-phase rectifiers are not operated at very light load so that the problem of load division between the two double three-phase rectifiers is not so serious as it is between the two groups of secondaries of one of the double three-phase rectifiers.

In accordance with the present invention, the excitation transformers 106 are each provided with a winding 109 which as illustrated, may be wound on the same portion of the core as the secondary winding 105. The winding 109 of each of the excitation circuits 86 to 91 are connected in series relation and across the interphase transformer 80 through a current limiting resistor 110. The windings 109 of excitation circuits 86, 87 and 88 are wound in the opposite direction from those of excitation circuits 89, 90 and 91 so that the sum of the voltages induced in windings 109 is zero under balanced conditions. Similarly the windings 109 of excitation circuits 92 to 97 are connected in series relation and across the interphase transformer 81.

The operation of this arrangement using transformers having a secondary voltage of peaked wave form is very similar to that described in connection with Fig. 1. The harmonic voltage appearing across the interphase transformer 80 is introduced into the grid circuit through the windings 109 in such a direction that it tends to retard the moment of ignition of the main valves 62 to 67 when the current conducted by the phase windings 76 and 77 are balanced. Both the positive and negative half cycles of the interphase voltage are impressed on the windings 109 but only one of these occurs at a time to be effective for the valves associated with the winding 76, while the other occurs at a time to be effective for the valves associated with the winding 77. When the current between the windings 76 and 77 becomes unbalanced the voltage across the interphase transformer 80 changes, in the manner explained in connection with Fig. 1, in such a way as to advance the moment of ignition of those valves associated with the winding carrying less than its share of the load and retard the moment of ignition of those valves associated with the winding carrying more than its share of the load. This results both from changes in the saturation of the excitation transformer and the appearance of the interphase voltages in the secondaries of the excitation transformers by transformer action.

From the foregoing description it is apparent that the present invention provides a simple arrangement for deriving a control potential which automatically maintains balance current conditions between a plurality of parallel valves or groups of valves by utilizing an inductive impedance element such as an interphase transformer having different portions connected in the direct current portion of each of the circuits between which it is desired to maintain a current balance and having these impedance elements mounted on the same core and closely coupled magnetically. The losses in the power circuit due to these impedance elements are very small and at the same time, a control potential of suitable magnitude and variable characteristics for maintaining balanced load conditions is derived.

While we have shown and described particular embodiments of our invention, it will be apparent to those skilled in the art that many changes and modifications may be made without departing from our invention in its broader aspects and we intend in the appended claims to cover all such changes and modifications as fall within the true spirit and scope of our invention.

What we claim as new and desire to secure by Letters Patent of the United States is:

1. In an electric valve converting apparatus, a supply circuit, a load circuit, electric translating apparatus connected between said circuits for transmitting energy therebetween including a plurality of inductive windings each having a plurality of electric discharge valves associated therewith, control means associated with each of said electric discharge valves, a phase equalizing inductive impedance element interconnecting said windings and associated discharge valves, and a control circuit for maintaining a predetermined division of load between the valves associated with each of said windings including means for deriving a control potential from said impedance element and impressing it on the control means associated with each of said valves to vary the excitation of said valves in response to unbalanced current conditions between said groups of phase windings and associated electric valves to restore balanced current conditions.

2. In an electric valve converting apparatus, an alternating current circuit, a direct current circuit, electric translating apparatus interconnecting said circuits including a plurality of groups of phase windings, a plurality of electric discharge valves associated with each of said groups of phase windings, a control electrode associated with each of said electric discharge valves, a phase equalizing inductive impedance element interconnecting said groups of phase windings and associated electric discharge valves, an excitation circuit for said control electrodes for controlling the conductivities of said electric discharge valves, and means responsive to the instantaneous voltage of said phase equalizing impedance element for impressing on said excitation circuit a potential which varies in response to unbalance between the current transmitted by the electric valves associated with each of said groups of phase windings to advance the phase of the excitation of those valves carrying less than their share of the load and to retard the phase of the excitation of those valves carrying more than their share of the load.

3. In electric valve converting apparatus, a supply circuit, a load circuit, electric translating apparatus connected between said circuits for transmitting energy therebetween including a plurality of inductive windings each having a plurality of electric discharge valves associated therewith, control means associated with each of said electric discharge valves, each of said windings having a neutral terminal, an inductive impedance element interconnecting said neutral terminals, and a control circuit for maintaining a predetermined division of load current between the valves associated with each of said inductive windings including means for deriving a control potential from said inductive impedance element and impressing it on the control means associated with each of said valves in such a manner as to retard the excitation of the valves associated with all of said inductive windings when the predetermined load division exists, said potential being variable with departure from said predetermined load balance to vary the excitation of said valves in a manner to restore balanced load conditions.

4. In an electric valve converting apparatus, a supply circuit, a load circuit, electric translating apparatus connected between said circuits for transmitting energy therebetween including a plurality of inductive windings each having a plurality of electric discharge valves associated therewith, each of said valves including a control electrode, each of said inductive windings having a neutral terminal, an inductive impedance element interconnecting said neutral terminals, and a control circuit for maintaining a predetermined division of load between the valves associated with each of said inductive windings including means for deriving a harmonic control potential from said inductive impedance element for varying the excitation of the control electrodes of said valves in accordance with the departure from said predetermined division of load current between the valves associated with each of said inductive windings.

5. In combination, an alternating current circuit, a direct current circuit, electric translating apparatus interconnecting said circuits and including transformer means and a plurality of electric discharge valves, said transformer means including a plurality of groups of electrically displaced phase windings, the phase windings of each of said groups having a common terminal connected with a common terminal of the phase windings of another of said groups through an inductive winding, and a circuit for controlling the conductivities of the electric valves associated with each of said groups of phase windings including means for deriving an alternating control potential from said inductive winding for automatically maintaining a predetermined load division between said groups of phase windings.

6. In an electric valve converting apparatus, a supply circuit, a load circuit, a double polyphase electric valve translating apparatus including a plurality of electrically displaced groups of phase windings and an electric discharge valve including a control electrode associated with each of said phase windings, an impedance element interconnecting said groups of phase windings and the valves associated therewith, and an excitation circuit for controlling the conductivity of said valves including means for impressing a harmonic voltage on said control circuit dependent upon the instantaneous difference in the voltages of the simultaneously conducting phases of said groups of electrically displaced phase windings to maintain a predetermined division of load between said groups of windings and associated discharge valves.

7. In an electric valve converting apparatus, a supply circuit, a load circuit, electric translating apparatus connected between said circuits for transmitting energy therebetween including a plurality of groups of phase windings each having a plurality of electric discharge valves associated therewith, a phase equalizing inductive impedance element interconnecting said groups of phase windings, each of said valves having a control electrode, and a control circuit therefor including means for producing a control voltage of peaked wave form and means for impressing the voltage of said impedance element on said control voltage producing means to vary the shape and phase relation of said peaked wave form control voltage in response to unbalance between the currents transmitted by said groups of phase windings to vary the excitation of said valves in a direction to maintain balanced conditions between the currents transmitted by said groups of phase windings.

8. In an electric valve converting apparatus, a supply circuit, a load circuit, electric translating apparatus connected between said circuits for transmitting energy therebetween including a plurality of groups of phase windings each having a plurality of electric discharge valves associated therewith, a phase equalizing inductive impedance element interconnecting said groups of phase windings, each of said valves having a control electrode and a control circuit therefor including means for producing a control voltage of peaked wave form, and means for deriving a voltage from said impedance element and impressing said derived voltage on said control voltage producing means to vary the shape and phase relation of said peaked wave form control voltage in response to unbalance between the currents transmitted by said groups of phase windings to vary the excitation of said valves in a direction to maintain balanced conditions between the currents transmitted by said groups of phase windings.

9. In an electric valve converting apparatus, a supply circuit, a load circuit, electric translating apparatus interconnecting said circuits including a plurality of groups of phase windings and a plurality of controlled electric discharge valves associated therewith for transmitting power between said circuits, the phase windings of each of said groups being electrically displaced from the phase windings of the other of said groups and having a common terminal connected with a common terminal of the phase windings of another of said groups through an inductive impedance element, a control circuit for controlling the conductivities of said electric discharge valves including a plurality of excitation transformer windings having electrically displaced phase windings for sequentially rendering said electric discharge valves conductive, and means for impressing the voltage of said inductive impedance element between the neutral terminals of said excitation transformer windings to vary the excitation of the electric valves associated with each of said groups of phase windings in a direction to maintain a predetermined division of load therebetween.

10. In an electric valve converting apparatus, a supply circuit, a load circuit, at least one of said circuits being an alternating current circuit, electric translating apparatus interconnecting said circuits for transmitting energy therebetween and including a plurality of electric valve means each having a control member associated therewith, said valve means being arranged to operate in parallel, a control circuit for controlling the conductivities of said electric valve means including a source of alternating control voltage having the frequency of said alternating current circuit, means for deriving a harmonic voltage from said translating apparatus which varies with unbalance between the currents transmitted by said parallel electric valve means, and means for impressing said alternating current control voltage and said harmonic voltage on said control members to vary the excitation thereof in a manner to restore balanced current conditions.

11. In an electric valve converting apparatus, a supply circuit, a load circuit, at least one of said circuits being an alternating current circuit, electric translating apparatus interconnecting said circuits including a plurality of inductive windings and a plurality of controlled electric discharge valves associated therewith for transmitting power between said circuits, the windings of one of said inductive networks being electrically displaced from the windings of the other of said networks, a phase equalizing inductive impedance element interconnecting said networks, a control circuit for controlling the conductivities of said electric discharge valves including a source of alternating voltage having the frequency of said alternating current circuit and means for deriving a harmonic voltage from said phase equalizing impedance element for varying the conductivities of said electric discharge valves in a manner to maintain a predetermined division of load current between said valves.

CLODIUS H. WILLIS.
MARTIN A. EDWARDS.